United States Patent [19]

Sakaeda

[11] Patent Number: 5,596,179

[45] Date of Patent: Jan. 21, 1997

[54] WEIGHING MACHINE WHICH SUBTRACTS TARE WEIGHTS

[75] Inventor: Keiko Sakaeda, Shiga, Japan

[73] Assignee: Ishida Co., Ltd., Japan

[21] Appl. No.: 162,107

[22] PCT Filed: May 12, 1993

[86] PCT No.: PCT/JP93/00628

§ 371 Date: Dec. 10, 1993

§ 102(e) Date: Dec. 10, 1993

[87] PCT Pub. No.: WO93/23724

PCT Pub. Date: Nov. 25, 1993

[30] Foreign Application Priority Data

May 15, 1992 [JP] Japan .................. 4-148813

[51] Int. Cl.$^6$ ............ G01G 13/00; G01G 19/32
[52] U.S. Cl. .................................. 177/25.18
[58] Field of Search ............ 177/25.18, 1; 364/466, 364/567

[56] References Cited

U.S. PATENT DOCUMENTS

| | | | |
|---|---|---|---|
| 4,049,068 | 9/1977 | Kavanaugh et al. | 177/25.18 |
| 4,415,048 | 11/1983 | Teraoka | 177/25.18 X |
| 4,418,772 | 12/1983 | Fukuda | 177/1 |
| 4,627,504 | 12/1986 | Moran | 177/1 |
| 4,661,917 | 4/1987 | Haze et al. | 177/25.18 X |
| 4,821,820 | 4/1989 | Edwards et al. | 177/25.18 |
| 4,846,291 | 7/1989 | Ōsawa et al. | 177/25.18 |
| 4,890,441 | 6/1990 | Meerkatz et al. | 177/50 X |

FOREIGN PATENT DOCUMENTS

| | | |
|---|---|---|
| 0275885 | 8/1983 | European Pat. Off. . |
| 62-188914 | 8/1987 | Japan . |
| 3-078633 | 4/1991 | Japan . |
| 2200468 | 1/1988 | United Kingdom . |

*Primary Examiner*—Michael L. Gellner
*Assistant Examiner*—Randy W. Gibson
*Attorney, Agent, or Firm*—Majestic, Parsons, Siebert & Hsue

[57] ABSTRACT

A combinational weighing machine, for combining a plurality of packaged products to be boxed in by selecting a combination of products such that the total of net weights of the products exclusive of their tare weights will be close to a given target weight, includes many weight detecting devices for measuring and detecting the gross weight of one or more packaged products, a subtractor or subtractors for obtaining net weights by subtracting tare weights from gross weights and a combination calculator for combining a plurality of the weight detecting devices and selecting an optimum combination out of them of which the total net weight is equal to or the closest to the target value.

10 Claims, 7 Drawing Sheets

WEIGHING MACHINE WHICH SUBTRACTS TARE WEIGHTS

BACKGROUND OF THE INVENTION

This invention relates to a weighing machine which weighs a plurality of products inclusive of their tare weights and selects an optimum combination such that the total of the net weights of the selected products is the closest to a given target weight.

There have been known combinational weighing machines (as disclosed, for example, in Japanese Utility Model Publication Jikkai 4-36428), having many weight detecting units for weighing products comprising one or more articles such as salmon slices and adapted to combine a plurality of them such that the total weight detected by them is the closest to a given target weight value. The products from the selected plurality of weight detecting units are, for example, boxed and shipped.

In the case of already packaged products, however, the total weight obtained by such a weighing machine includes the tare weights. If the packaged products are vacuum-packed salmon slices, for example, the tare weights may be large enough to be non-negligible. Thus, tare weights must be subtracted and net weights of products must be obtained accurately when a large number of already packaged products are put in a box for a commercial purpose. Prior art weighing machines could not handle a situation like this because the net weights could not be ascertained.

In view of the above, it is an object of the present invention to provide a combinational weighing machine which subtracts tare weights and hence can obtain a combination of products such that the total of their net weights exclusive of their tare weights approaches a given target weight value even where the products are already packaged.

Another object of the invention is to provide such a combinational weighing machine capable of reducing the error due to tare weights even in situations where there are fluctuations in the numbers of products weighed by the individual weight detecting units or the total number of products finally to be put in a box.

SUMMARY OF THE INVENTION

A combinational weighing machine according to a first embodiment of the present invention, with which the first of the aforementioned objects can be achieved, may be characterized as comprising many weight detecting units each for measuring the gross weight of one or more packaged products, subtracting means for subtracting tare weights from the measured gross weights to thereby obtain net weights, and combination calculating means for combining a plurality of these weight detecting units and selecting an optimum combination of such that the sum of the net weights measured thereby is equal, or the closest, to a given target weight value. With a machine thus structured, a combination of already packaged products, of which the gross weights have been detected by the detecting units, can be obtained such that the sum of the net weights of the combined products, with the tare weights subtracted therefrom, is equal, or the closest, to a target value. Thus, the present invention makes it possible to sell and buy boxed products on the basis of their net weights even where, for example, the box contains a plurality of already packaged products.

A weighing machine according to another embodiment of the invention may be characterized as comprising many weight detecting units for measuring the gross weight of one or more packaged products, a gross target weight setting means for setting a gross target weight inclusive of the sum of the tare weights for combined products as well as a target weight representing the sum of net weights of products, and a combination calculating means for combining a plurality of the weight detecting units to obtain the sum of the gross weights measured thereby and selecting a particular combination which would give a sum that is equal, or the closest, to a target gross weight. If a weighing machine thus structured is used to combine packaged products of which the gross weights have been measured by a plurality of the weight detecting units, the combination is selected such that the sum of these gross weights becomes close to the target gross weight inclusive of tare weights. In this case, too, the sum of the net weights of the products becomes close to the target net weight when the combined packaged products are put in a box.

Another combinational weighing machine, with which the second of the aforementioned objects can be achieved, may be characterized as comprising not only many weight detecting units each for measuring the gross weight of one or more packaged products, subtracting means for subtracting the tare weights from the measured gross weights to thereby obtain net weights, and combination calculating means for combining a plurality of these weight detecting units and selecting an optimum combination such that the sum of the net weights measured thereby is equal, or the closest, to a given target weight value, but also a number determining means for determining the number of products measured by the individual weight detecting units from the gross weights detected thereby. The aforementioned subtracting means are each adapted to subtract a tare weight from the detected gross weight according to the number of products determined by this number determining means. With a machine thus structured, errors due to tare weights can be reduced and the net weight of a product can be obtained accurately even if there are fluctuations in the numbers of products which are weighed by the individual weight detecting units or in the number of products which are finally boxed in.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

DETAILED DESCRIPTION OF THE INVENTION

In what follows, embodiments of the invention are described with reference to the figures.

Figure 1:
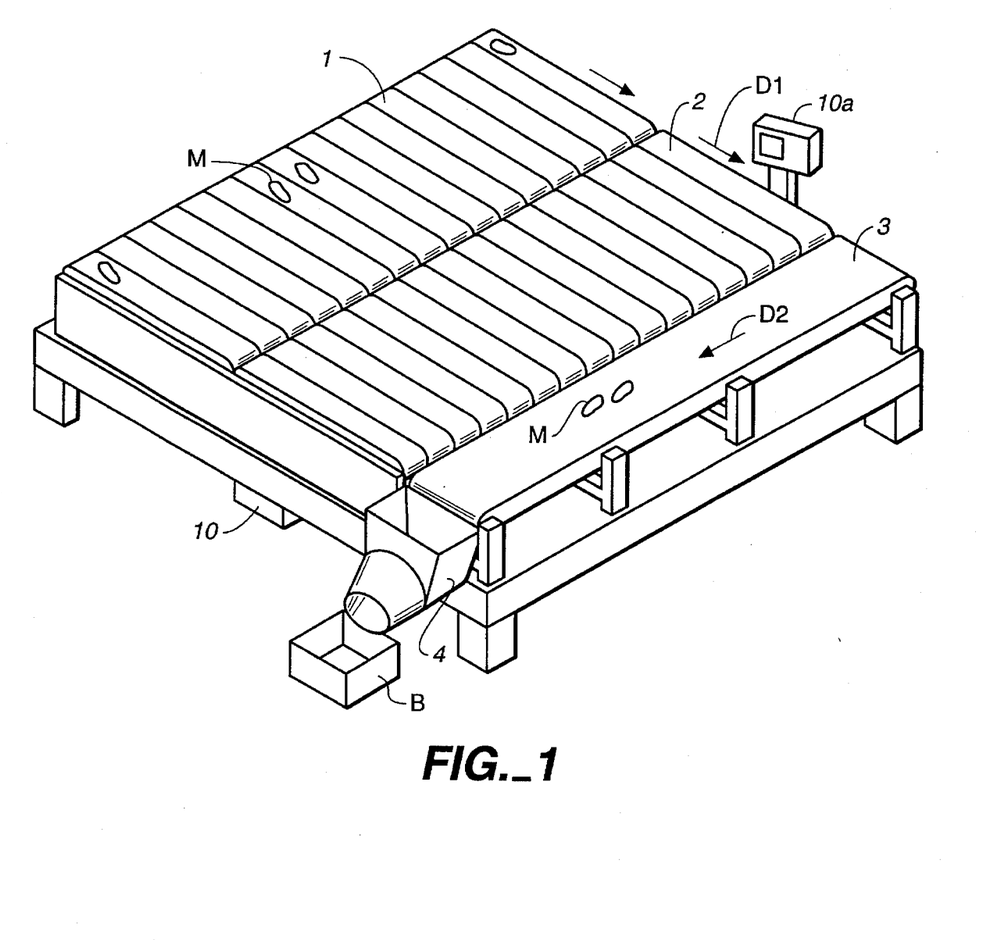
FIG. 1 is a diagonal view of a combinational weighing machine with tare weight subtracting means according to a first embodiment of this invention.

FIG. 1 shows a combinational weighing machine with tare weight subtracting means according to a first embodiment of this invention, having many (such as 16) feeding conveyers 1 arranged in parallel and as many weighing conveyers 2 parallel to one another and each on the downstream side of corresponding one of the feeding conveyers 1. Each of the feeding conveyers 1 serves to individually transport packaged products M to the corresponding weighing conveyer 2 for weighing. Each of the weighing conveyers 2 is of a known type formed with a belt conveyer supported by a load cell serving as a weight detecting unit and serves to weigh successively the packaged products M received from the corresponding feeding conveyer, while it is being transported by the belt conveyer or is stationary.

On the downstream side of the weighing conveyers 2, there are a collecting conveyer 3 for collecting the products M discharged from the weighing conveyers 2 and transporting them in a direction D2 perpendicular to the direction of transportation D1 by the weighing conveyers 2 and a discharge chute 4 for discharging the products M transported by the collecting conveyer 3. The operations of these feeding, weighing and collecting conveyers 1, 2 and 3 are controlled by a controller 10 provided with a control panel 10a.

Figure 2:
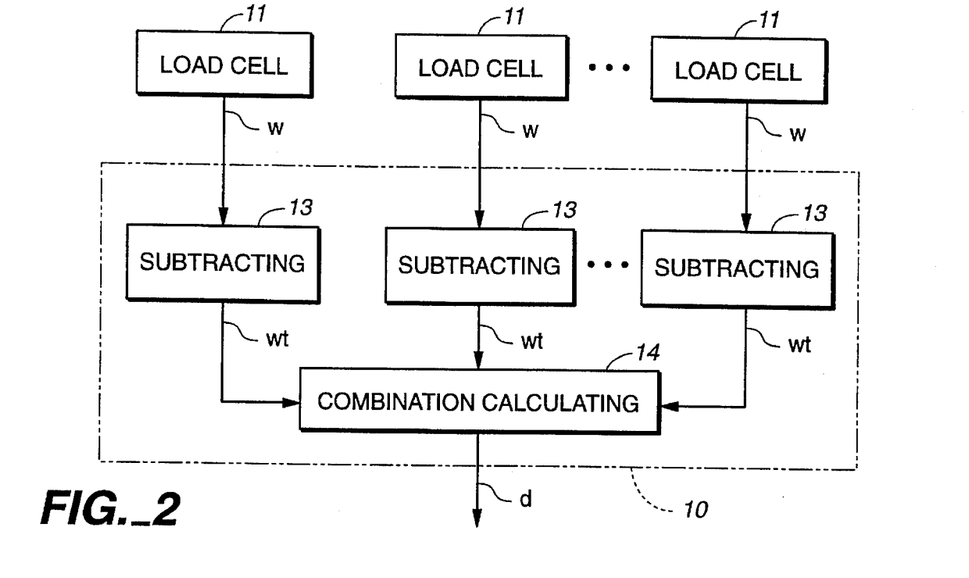
FIG. 2 is a block diagram of a controller for the weighing machine of FIG. 1.

As shown in FIG. 2, the controller 10 is provided with subtracting means 13 each corresponding to the load cell 11 of different one of the weighing conveyers 2 and serving to subtract the tare weight for each product from its measured gross weight to thereby obtain its net weight. The controller 10 also includes a combination calculating means 14 for combining a plurality of the load cells 11 and selecting a combination corresponding to a total net weight which is equal, or the closest, to a target weight.

The aforementioned tare weight is preliminarily inputted into and stored in the subtracting means 13 as a fixed value for each kind of products. The target weight and the number in the combination are preliminarily inputted into and stored in the combination calculating means 14. The number to be combined, however, need not be specially inputted. In such a case, the number of load cells 11 to be combined, that is, the number of products M to be selected and put in a box may be variable.

Next, the operations of the structure described above will be explained. With reference back to FIG. 1, workers successively place packaged products M such as vacuum-packed salmon slices one by one on each of the sixteen feeding conveyers 1. There are fluctuations in the weight of these products M, for example, in the range of 250–350 g.

These products M are transferred onto the weighing conveyers 2 by the feeding conveyers 1, and each weighing conveyer 2 is stopped when the product M thereon comes to a position approximate at its center. Under this condition, the gross weight W of the product M is detected by the load cell 11 corresponding to the weighing conveyer 2 and a gross weight signal w is outputted. The corresponding subtracting means 13, upon receiving this gross weight signal w from the load cell 11, subtracts therefrom the tare weight t for the product, obtains its net weight $W_T$ (=W−t) and outputs a net weight signal $w_t$. The tare weight t is set as a fixed value, such as 20 g, independent of the gross weight W.

The combination calculating means 14 combines a plural number (say, ten) of the net weight signals $w_t$, selects those of the load cells 11 such that the sum $\Sigma W_T$ of their net weights $W_T$ is equal to, or greater than and the closest to, a given target weight, such as 3 kg, and outputs a drive signal d to the weighing conveyers 2 associated with the selected load cells 11. Only those of the weighing conveyers 2 receiving the drive signal d are driven and discharge the products M thereon onto the collecting conveyer 3 which serves to collect the products M and supply them to the discharge chute 4. The products M are passed through the discharge chute 4, dropped into a box B placed below the discharge chute 4 and packaged therein by an operator.

In synchronism with the driving of the selected weighing conveyers 2, the corresponding feeding conveyers 1 are driven such that the products M thereon are transported onto these weighing conveyers 2, and the next cycle of combination calculation is carried out. New products M are placed on the empty feeding conveyers 1. If an automatic distributing means of a known kind (such as disclosed in Japanese Utility Model Publication Jikkai 4-36428) is used, this operation of placing new products M on the feeding conveyers 1 can be automated.

This series of operations as described above is repeated to set the sum $\Sigma W_T$ of the net weights $W_T$ of products M (exclusive of the tare weights t) equal to or close to a given target weight. Thus, when a selected plurality of packaged products are packed inside a box, the sum $\Sigma W_T$ of their net weights $W_T$ is close to the target net weight, and the products can be sold and bought on the basis of their net weights.

Figure 3:
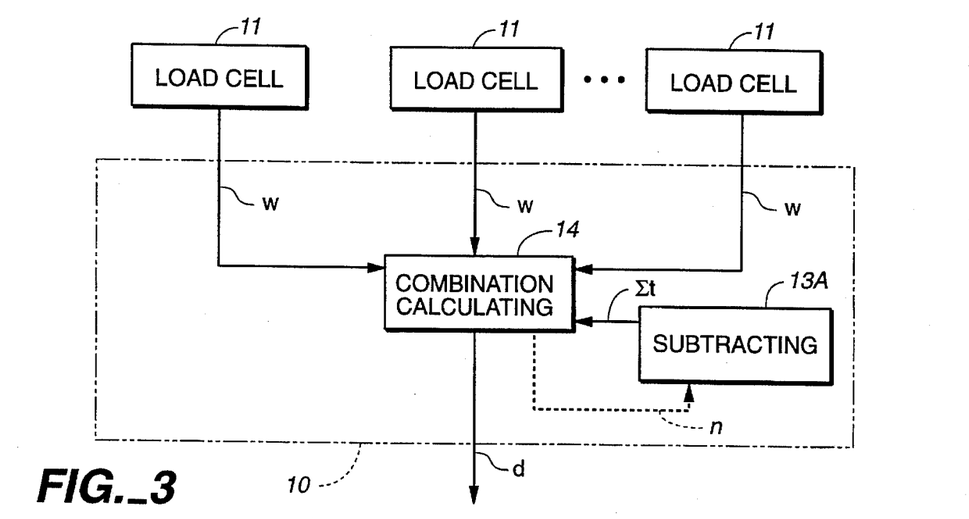
FIG. 3 is a block diagram of a controller for another combinational weighing machine according to a second embodiment of the invention.

According to the first embodiment of the invention described above, a subtracting means 13 is provided to each load cell 11 corresponding to a weighing conveyer. The second embodiment of the invention shown in FIG. 3 is different in that there is only one subtracting means 13A which serves to subtract the sum Σt of the tare weights t of the combined products M from the sum ΣW of combined gross weights W detected by the load cells 11. Here, the sum Σt is obtained as the product of the number N (preliminarily set, say, to ten) of the products M to be combined and the preliminarily known value of tare weight t. Thus, the sum $\Sigma W_T$ of the net weights $W_T$ is obtained as ΣW−Σt and the combination calculation is carried out by the combination calculating means 14 on the basis of this sum $\Sigma W_T$.

If the number N to be combined in the combination calculation is allowed to vary in this second embodiment, a combination number signal n indicative of the combination number N is inputted from the combination calculating means 14 into the subtracting means 13A, and the sum Σt of the tare weights t corresponding to the combination number N is inputted from the subtracting means 13A back into the combination calculating means 14.

Figure 4:
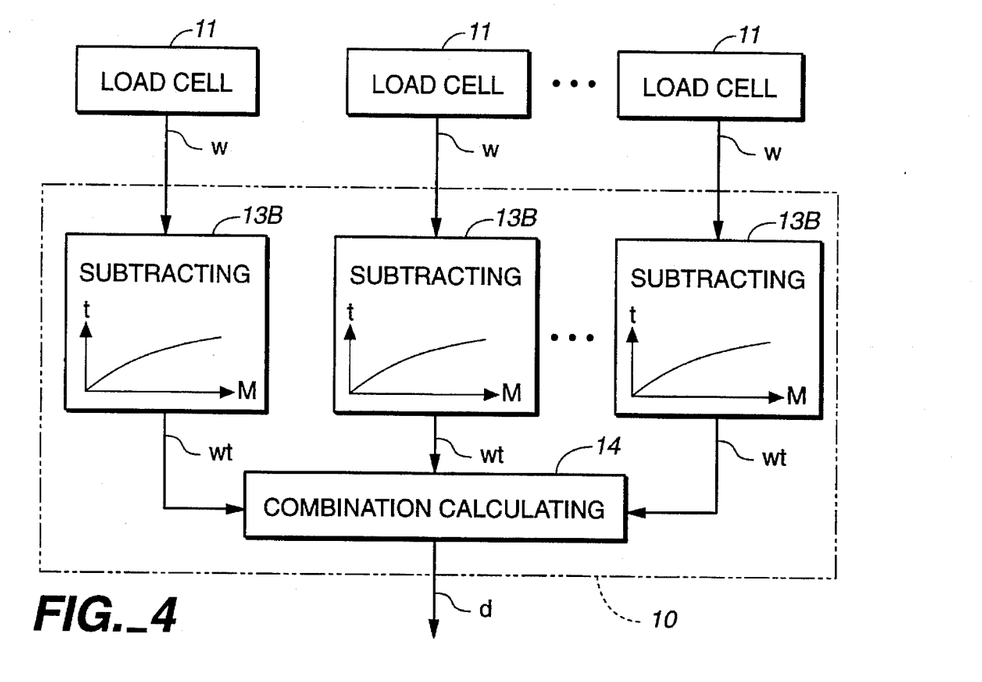
FIG. 4 is a block diagram of a controller for still another combinational weighing machine according to a third embodiment of the invention.

According to the first and second embodiments of the invention described above, the tare weight t is set as a constant independent of the gross weight W of the individual products M. There may be situations, however, where the variations in the tare weight t according to the kind of products M are large and not negligible. In such a situation, it is preferred, as shown schematically in FIG. 4 representing a third embodiment of the invention, to store in memory means of the subtracting means 13B the values of tare weight t(W) which are variable as a function of the gross weight W. When a gross weight W is detected by a load cell 11, the tare weight t(W) corresponding to this detected weight W is subtracted from the gross weight W to obtain the net weight $W_T$ of the weighed product. According to this embodiment, the net weights of products can be more accurately obtained.

Figure 5:
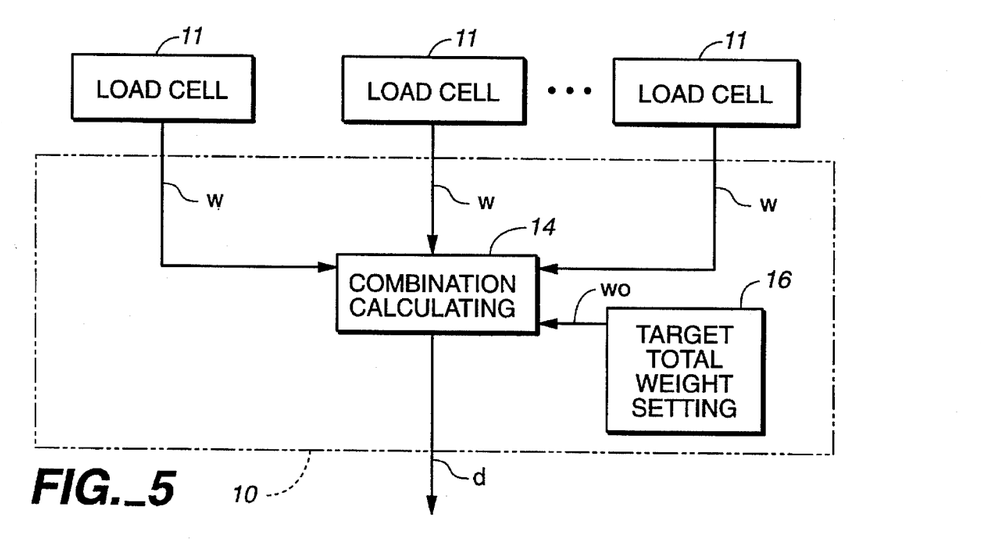
FIG. 5 is a block diagram of a controller for still another combinational weighing machine according to a fourth embodiment of the invention.

FIG. 5 shows a fourth embodiment of the invention characterized by a target total weight (with tare) setting means 16, instead of the subtracting means 13A of FIG. 3. This target total weight (with tare) setting means 16 serves to set a target total weight $W_0$ by adding the sum $\Sigma t$ of the tare weights of the products to be combined to the target value for the sum $\Sigma W_T$ of the net weights $W_T$ of the products M. The combination calculating means 14 serves to make combinations of a plurality of the load cells 11 to obtain the sum $\Sigma W$ of their gross weights W, select a combination of the load cells 11 providing a value which is equal to, or the closest to, the set target total weight (with tare) $W_0$, and output a drive signal d to the weighing conveyers 2 corresponding to the selected load cells 11. In this manner, the sum $\Sigma W_T$ of the net weights $W_T$ of the products M (with tare weights t subtracted) is set equal to, or close to, the target net weight value of $W_0 - \Sigma t$.

Figure 6:
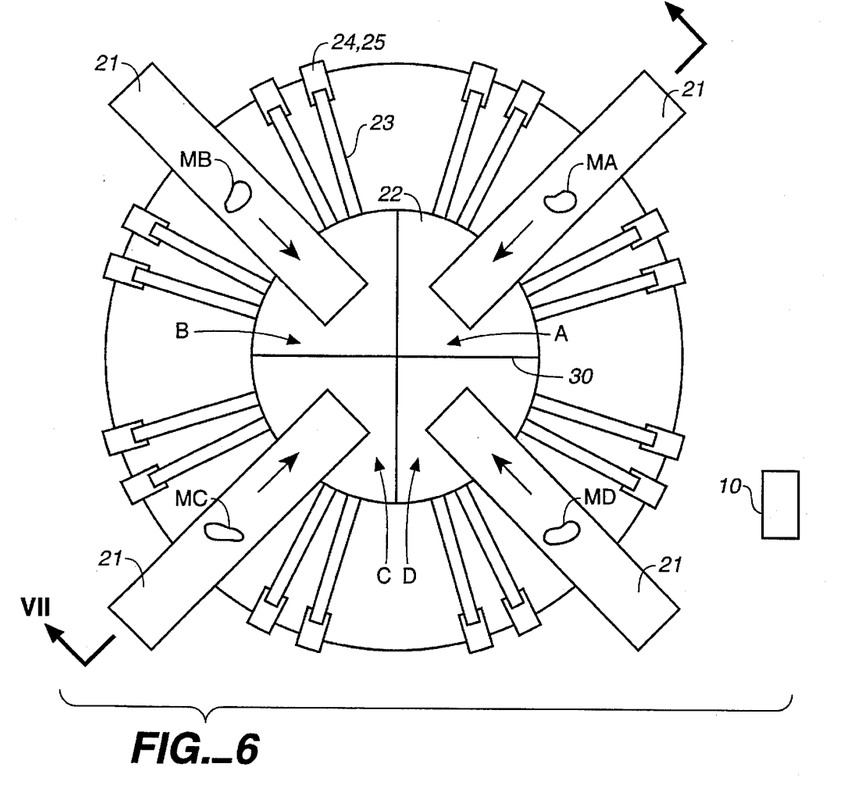
FIG. 6 is a plan view of still another combinational weighing machine according to a fifth embodiment of the invention.
Figure 7:
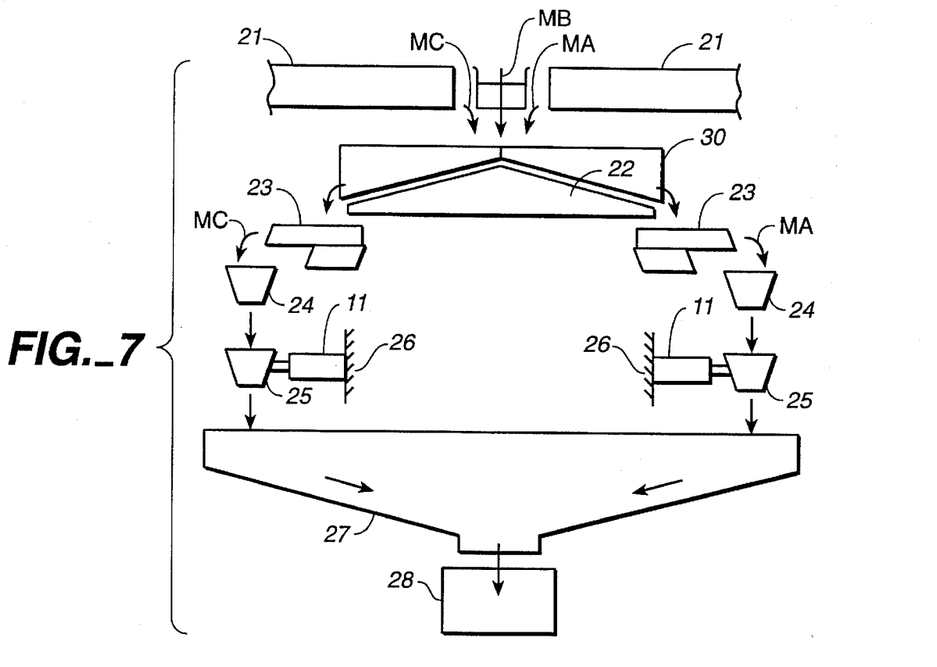
FIG. 7 is a sectional view taken along line VII—VII of FIG. 6.

FIG. 6 is a plan view of a fifth embodiment of the present invention adapted to a combinational weighing machine for selecting, for example, a specified number (such as three) each of a plurality of different kinds of articles packaged in small bags such as four differently flavored, packaged potato chips MA, MB, MC and MD and to put these selected twelve small bags together in a large bag. For transporting the four different types of products MA–MD, there are four transporting conveyers 21 and, as shown in FIG. 7, there is a conically shaped dispersion feeder 22 below the transporting conveyers 21. Many (such as sixteen) vibratory feeders 23 are radially disposed around the outer periphery of the dispersion feeder 22. These vibratory feeders 23 serve to transport the products MA–MD radially outward while vibrating and cause them to drop into sixteen weigh hoppers 25 through individually associated pool hoppers 24. Each weigh hopper 25 is provided with one of the load cells 11 (weight detecting unit). Each load cell 11 has one edge affixed to a base structure and the other edge attached to the weigh hopper 25 associated therewith. The load cells 11 serve to detect the weights of the products MA–MD in the weigh hoppers 25. Disposed below the weigh hoppers 25 is a collecting-discharging chute 27, below which there is a packaging machine 28.

As better seen in FIG. 6, this combinational weighing machine is partitioned into four different regions A, B, C and D in the direction of its circumference. The four different kinds of products MA–MD are delivered separately into these four regions by the four transporting conveyers 21. Products of each kind MA, MB, MC or MD are weighed in the weigh hoppers 25 corresponding to the corresponding one of the regions A, B, C and D. Above the dispersion feeders 22 are partition walls 30 for ensuring that the products MA–MD which are delivered thereonto by the transporting conveyers 21 will be deposited correctly in intended regions without becoming mixed together.

Figure 8:
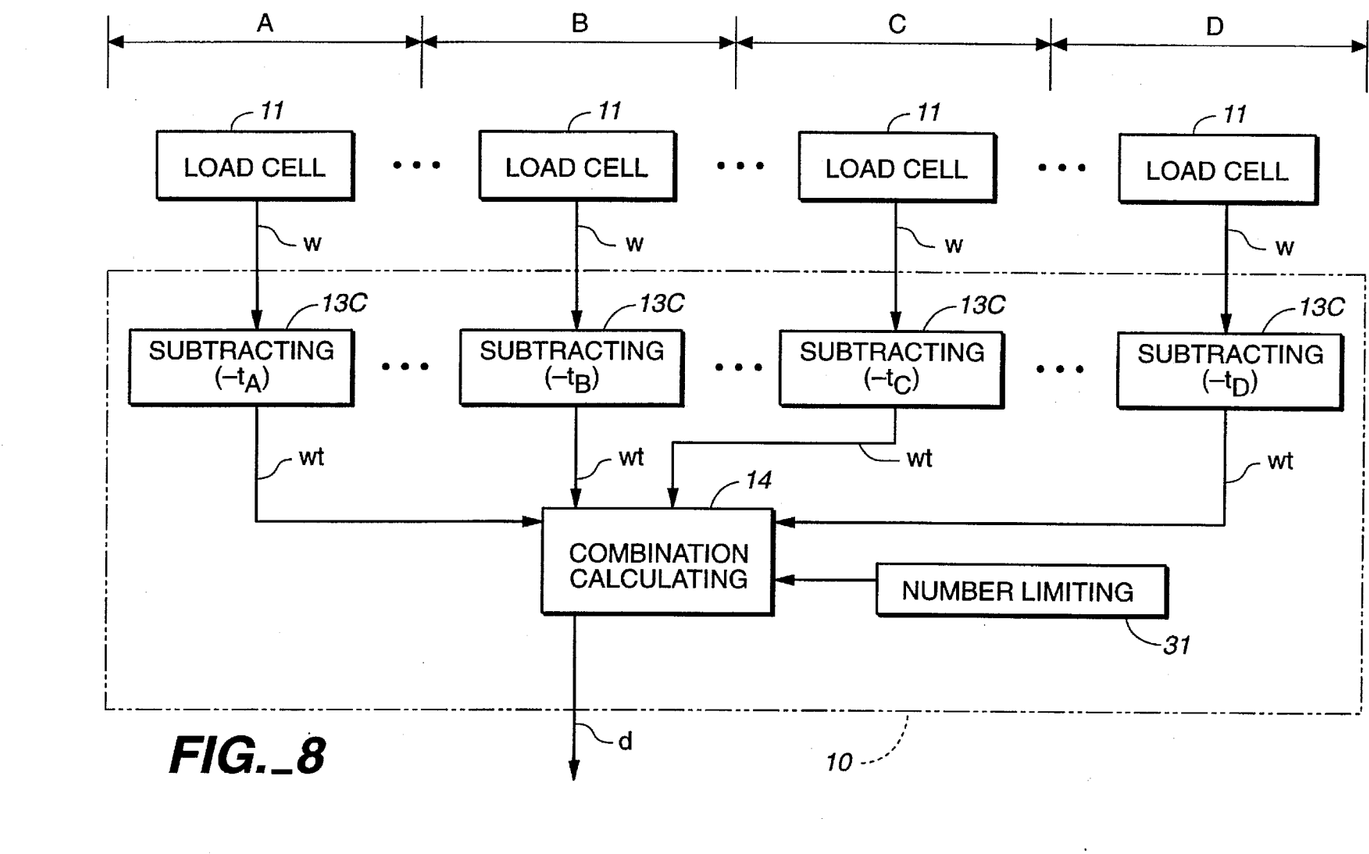
FIG. 8 is a block diagram of a controller for the weighing machine of FIGS. 6 and 7.

Numeral 10 indicates a controller for the combinational weighing machine. As shown in FIG. 8, the controller 10 for this combinational weighing machine is provided with subtracting means 13C for subtracting a tare weight t from gross weights W detected by the load cells 11. Since the four different kinds of products MA–MD are expected to have different tare weights t, the subtracting means 13C are adapted to subtract different tare weights $t_A$, $t_B$, $t_C$ and $t_D$ from the measured gross weights W, depending on the regions A, B, C and D, to obtain their net weights $W_T$. Although each of the products MA–MD is produced in a preliminary process so as to contain a specified net weight, there are usually fluctuations in their net weights. Thus, they are weighed again by the load cells 11, and their net weights $W_T$ are ascertained by using the subtracting means 13C to subtract therefrom the tare weights $t_A$, $t_B$, $t_C$ and $t_D$.

The controller 10 also includes a number limiting means 31 for limiting the numbers of combinations such that three each of the four kinds of packaged products MA–MD will be selected from the corresponding regions A, B, C and D and a combination of twelve products will be produced. By following these limiting conditions, the combination calculating means 14 combines twelve of the sixteen load cells 11, selects a combination such that the total $\Sigma W_T$ of the net weights $W_T$ becomes equal to, or the closest to, the target weight, and outputs a drive signal d for opening the gates (now shown) of the weigh hoppers 25 corresponding to the selected load cells 11. When this drive signal d is received, the products MA–MD are discharged only from the selected weigh hoppers 25 through the collecting-discharging chute 27 and packaged in a bag by the packaging machine 28. If the target weight for the sum $\Sigma W_T$ is 300 g, for example, the net weights $W_T$ of the products MA–MD are approximately 25 g and fluctuate therearound. By this fifth embodiment of the invention, too, it is possible to set the sum $\Sigma W_T$ of the net weights $W_T$ of the products M exclusive of the tare weights equal to or close to the given target value, and hence products can be sold and bought on the basis of their true weights.

Figure 9:
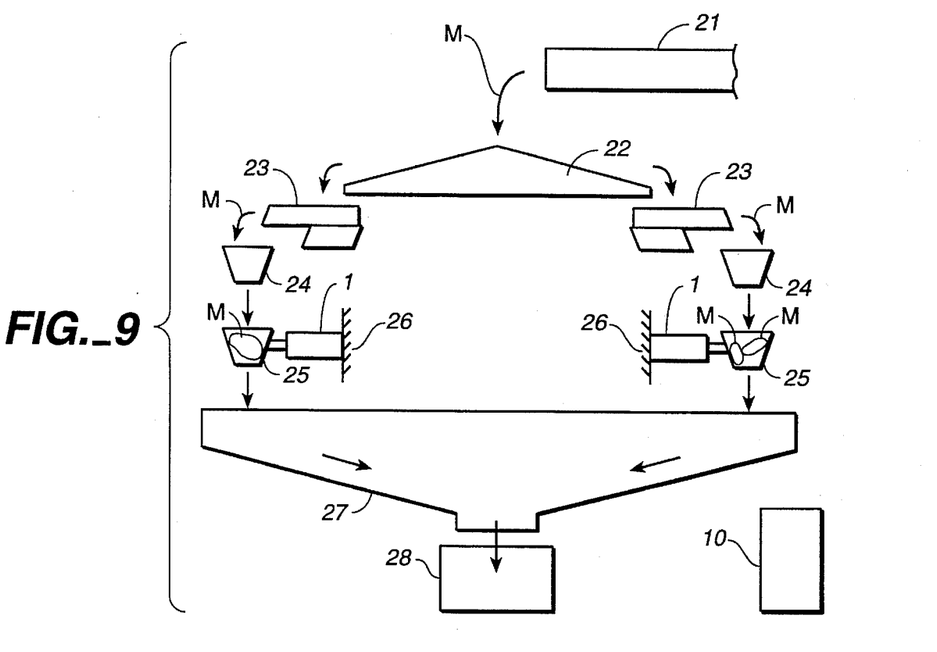
FIG. 9 is a schematic side view of still another combinational weighing machine according to a sixth embodiment of the invention.

In each of the embodiments described above, only one product M is weighed by each load cell 11 at a time. FIG. 9 illustrates a combinational weighing machine which is identical to the one shown in FIG. 7 except there is only one transporting conveyer 21 and there are no partition walls 30. If use is made of such a combinational weighing machine when the volume of each product is much smaller than the capacity of the weigh hoppers 25, more than one product M may be received together in a weigh hopper 25 and weighed together by one load cell 11. In such a situation, since the number of the load cells 11 selected for combination and the total number N of products M become different, the actual total tare weight (N times t) becomes different from the sum of tare weights subtracted by the subtracting means according to the number of load cells 11 to be selected. In other words, the sum of net weights cannot be obtained accurately.

Figure 10:
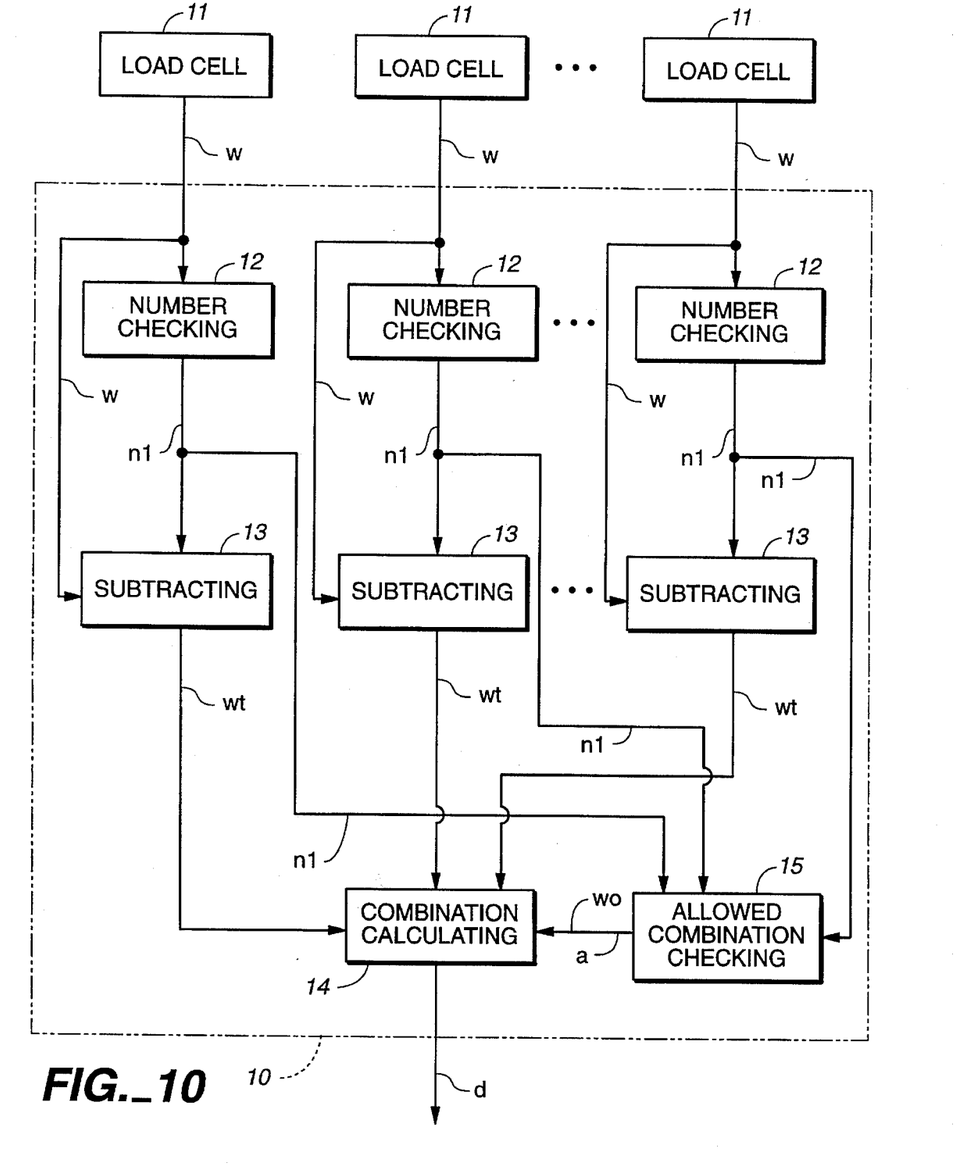
FIG. 10 is a block diagram of a controller for the weighing machine of FIG. 9.
Figure 11:
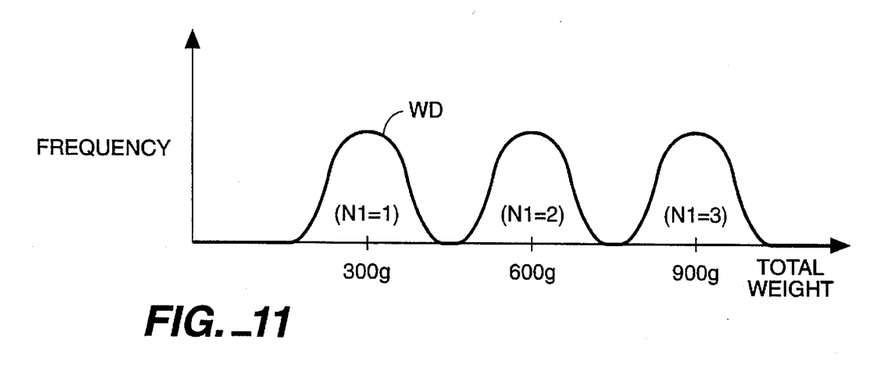
FIG. 11 is a diagram for showing the process by the number determining means of the weighing machine of FIGS. 9 and 10.

In view of the above, the sixth embodiment of the invention shown in FIG. 10 is characterized as having number checking means 12 each corresponding to one of the load cells 11. Each of the number checking means 12 is adapted to receive a weight signal w from the associated load cell 11, to determine on the basis of this weight signal w the number $N_1$ of the products M weighed by this load cell 11 and to output a number signal $n_1$ indicative of the determined number $N_1$. This determination may be carried out, for example, by dividing the detected gross weight W by an empirically predetermined average weight (with tare) $W_I$ of a single product and rounding off the digits below the decimal point to obtain an integer. If the average weight (with tare) $W_1$ of a single product is 300 g, for example, the distribution of measured weight W detected by a load cell 11 would be generally as shown by weight distribution curve WD shown in FIG. 11, having a normal distribution around 300 g representing situations where there was only one product in the weigh hopper 25, another normal distribution around 600 g representing situations where there were two products, still another normal distribution around 900 g representing situations where there were three products, and so forth. Since an overlap is unlikely between neighboring distributions corresponding to different values of $N_1$, the number $N_1$ of products in the weigh hopper 25 is accurately determined by the rounding-off method described above.

Since tare weights are generally much smaller than net weights and the gross weight W of a product is relatively close to its net weight $W_T$, the average value $W_{T1}$ of net weights $W_T$, instead of the average gross weight (with tare) $W_1$, may be used to divide the measured total gross weight W to obtain the number of products M by rounding off. If necessary, the aforementioned average gross and net weight values $W_1$ and $W_{T1}$ may be updated by using a learning routine of a known kind.

The subtracting means 13 of FIG. 10 are each adapted to receive a gross weight signal w and a number signal $n_1$, to obtain a net weight $W_T$ by subtracting a correct tare weight ($N_1$ times t) from the gross weight (with tare) W measured by the corresponding load cell 11, where $N_1$ is the number of products indicated by the number signal $n_1$, and to output a net weight signal $w_t$. In this embodiment, the tare weight is treated as being of a fixed value and is preliminarily stored in memory means of the subtracting means 13.

The number signals n from the number checking means 12 are outputted into an allowed combination checking means 15 which is adapted to receive the number signals $n_1$, to combine a plurality of the load cells 11, and to output an allowed combination signal a to the combination calculating means 14 only if the sum N $(=\Sigma N_1)$ of the numbers $N_1$ of products included in the combination of load cells 11 is within a specified range. Whenever the allowed combination signal a and the net weight signals $w_t$ from the subtracting means 13 are received, the combination calculating means 14 calculates sums $\Sigma W_T$ of the net weights $W_T$ from allowed combinations and selects the combination of load cells 11 corresponding to the sum $\Sigma W_T$ which is equal to, or the closest to a given target weight.

Next, the operations of a machine according to the sixth embodiment of the invention described above with reference to FIGS. 9–11 are explained more in detail.

First, packaged products M are transported by the transporting conveyer 21 shown in FIG. 9 to a position above the center of the dispersion feeder 22 to be supplied thereonto. These products M are then supplied from the dispersion feeder 22 to the vibratory feeders 23 disposed radially around the outer periphery of the dispersion feeder 22, and are dropped into the weigh hoppers 25 via the pool hoppers 24. Each weigh hopper 25 may receive one or more of the products M, and each load cell 11 detects the gross weight W of the product (or products) M in the weigh hopper 25 associated therewith. On the basis of the gross weights W thus detected, the number checking means 12 shown in FIG. 10 calculate the number $N_1$ of the product (or products) M weighed by each of the load cells 11. These numbers N and the gross weights W are used by the subtracting means 13 to calculate the net weights $W_T$ for each load cell 11 by the following formula:

$$W_T = W - N_1 t. \tag{1}$$

The allowed combination checking means 15 shown in FIG. 10 uses these numbers $N_1$ to select allowable combinations of the load cells 11. From these allowable combinations of the load cells 11, the combination calculating means 14 selects a combination of the load cells 11, of which the sum $\Sigma W_T$ of the net weights $W_T$ takes an optimum value, and outputs a drive signal d for opening the gates (not shown) of the weigh hoppers 25 corresponding to the selected load cells 11. The products M are discharged only from the selected weigh hoppers 25 which received the drive signal d, and the discharged products M pass through the collecting-discharging chute 27 to be packaged in a big bag by the packaging machine 28.

With a machine thus operated, the number $N_1$ of products M being weighed by each load cell 11 is determined from the gross weight W detected by that load cell 11 and a tare weight $N_1 t$ corresponding to this number $N_1$ is subtracted, thereby eliminating errors which may be caused by fluctuations in the tare weight due to changes in the number $N_1$ of products M being weighed. Thus, it is possible to obtain net weights $W_T$ from the load cells 11 accurately and to minimize the error due to the tare even if there are fluctuations in the numbers $N_1$ of products M being weighed by the individual load cells 11 and/or in the total number N $(=\Sigma N_1)$ of the products M to be finally put in a box.

According to the sixth embodiment of the invention described above, the allowed combination checking means 15 serves to preliminarily select and allow only certain combinations of the load cells 11 to be considered. Thus, the total number N of the products M which are finally put in a box or a large bag always falls within a specified range. This means that the fluctuation in the total number N of the products M put in a box or a big bag is reduced. The allowed combination checking means 15, however, is not essential according to the invention.

Instead of providing a subtracting means 13 corresponding to each of the load cells 11 as explained above, the controller 10 may be structured, as shown in FIG. 3, with only one subtracting means 13A for subtracting the tare weight Nt corresponding to the total number N $(=\Sigma N_1)$ of the combined products M from their total gross weight $\Sigma W$ (with tare) to thereby obtain the sum $\Sigma W_T$ of combined net weights such that the combination calculating means 14 will select a combination on the basis of such total net weights $\Sigma W_T$.

Although it was assumed in the sixth embodiment of the invention that the tare weight t of each product M was the same independent of its gross weight W, the controller 10 may be structured as shown in FIG. 4 such that the tare weight t stored in the subtracting means 13B can be varied according to the gross weight W of each product M. Net weights $W_T$ can be obtained more accurately in this manner.

This invention is intended to be used in connection with weighing machines for weighing a plurality of packaged products, selecting some of them such that their total net weight will be acceptable in view of a given target weight and putting them in a box or a big bag. The weighing machine may be of a circular type having many weigh hoppers arranged on the periphery of a circle, of a linear type having many weigh hoppers arranged linearly, or of a parallel type having many weighing conveyers arranged parallel to one another. They may also be of a semi-automatic type which requires packaged products to be manually supplied onto weighing conveyers or into weigh hoppers but with which weighing is carried out automatically, or of a fully automatic type which carries out all supplying and weighing operations automatically.

What is claimed is:

1. A combinational weighing machine comprising:

a large plural number of weight detecting means each for weighing and thereby detecting the gross weight of one or more packaged products;

subtracting means each functionally associated with one of said weight detecting means for subtracting a tare weight from the gross weight detected by the associated weight detecting means and thereby obtaining the net weight of said one or more packaged products; and combination calculating means for combining a small plural number of said weight detecting means to calculate the total net weight of the packaged products weighed thereby and selecting a combination of said weight detecting means according to a predefined criterion including totals of the net weights obtained by said subtracting means and a given target weight value, said small plural number being smaller than said large plural number, said tare weight being variable according to the gross weight from which said tare weight is subtracted.

2. The combinational weighing machine of claim 1 further comprising allowed combination checking means for preventing said combination calculating means from making combinations of said weight detecting means for which the total number of the packaged products weighed thereby is not within a specified range.

3. A combinational weighing machine comprising:

a large plural number of weight detecting means each for weighing and thereby detecting the gross weight of one or more packaged products;

subtracting means each functionally associated with one of said weight detecting means for subtracting a tare weight from the gross weight detected by the associated weight detecting means and thereby obtaining the net weight of said one or more packaged products;

combination calculating means for combining a small plural number of said weight detecting means to calculate the total net weight of the packaged products weighed thereby and selecting a combination of said weight detecting means according to a predefined criterion including totals of the net weights obtained by said subtracting means and a given target weight value, said small plural number being smaller than said large plural number; and number checking means for determining numbers $N_1$ of said packaged products weighed by individual ones of said weight detecting means, depending on the gross weights detected by said individual ones of said weight detecting means, said tare weight being determined by said numbers $N_1$.

4. The combinational weighing machine of claim 3 further comprising allowed combination checking means for excluding combinations of said weight detecting means for which the total of said numbers $N_1$ is not within a specified range.

5. The combinational weighing machine of claim 3 wherein said number checking means determines said numbers $N_1$ by dividing the gross weights detected by said weight detecting means by a standard unit gross weight of said products.

6. The combinational weighing machine of claim 3 wherein said number checking means determines said numbers $N_1$ by dividing the gross weights detected by said weight detecting means by a standard net unit weight without tare of said products.

7. A combinational weighing machine comprising:

a large plural number of weight detecting means for weighing and thereby detecting the gross weight of one or more packaged products;

target total gross weight setting means for setting a target total value $\Sigma W$ of gross weights of those of said packaged products to be combined inclusive of the tare weights of said packaged products to be combined, depending on a target total net weight of said packaged products to be combined; and combination calculating means for combining a small plural number of said weight detecting means, obtaining the total of gross weights from said combined small plural number of said weight detecting means, and selecting an optimum combination of said weight detecting means having a total weight which is equal to or the closest to said target total value $\Sigma W$ of gross weights inclusive of tare weights, said small plural number being smaller than said large plural number.

8. A combinational weighing machine comprising:

a plural number of weight detecting means each for weighing and thereby detecting the gross weight of one or more packaged products;

combination calculating means for making a combination of a smaller plural number of said weight detecting means and calculating the total gross weight of the packaged products weighed by said combination of the weight detecting means; and subtracting means for subtracting a total tare weight from said total gross weight and thereby obtaining the total net weight of the packaged products weighed by said combination of the weight detecting means, said total tare weight being the sum of tare weights for the packaged products weighed by said combination of the weight detecting means;

said combination calculating means also selecting a particular combination of the weight detecting means according to a predefined criterion including the total net weights obtained by said subtracting means and a given target weight value.

9. The combinational weighing machine of claim 8 wherein said tare weight is of a fixed value independent of the total gross weight from which said tare weight is subtracted.

10. The combinational weighing machine of claim 8 wherein said tare weight is variable according to the gross weight detected by said weight detecting means.

* * * * *